United States Patent
Sergott et al.

(10) Patent No.: US 10,373,588 B2
(45) Date of Patent: Aug. 6, 2019

(54) SYSTEM AND METHOD FOR MANAGING ACTION ITEMS

(71) Applicant: PRO Unlimited Global Solutions, Inc., Boca Raton, FL (US)

(72) Inventors: Ted H. Sergott, Moraga, CA (US); Nataliya Kolb, San Francisco, CA (US)

(73) Assignee: PRO Unlimited Global Solutions, Inc., Boca Raton, FL (US)

( * ) Notice: Subject to any disclaimer, the term of this patent is extended or adjusted under 35 U.S.C. 154(b) by 265 days.

(21) Appl. No.: 15/153,246

(22) Filed: May 12, 2016

(65) Prior Publication Data

US 2016/0334949 A1 Nov. 17, 2016

Related U.S. Application Data

(60) Provisional application No. 62/160,165, filed on May 12, 2015.

(51) Int. Cl.
| | |
|---|---|
| *G09G 5/12* | (2006.01) |
| *G09G 5/34* | (2006.01) |
| *H04B 1/3827* | (2015.01) |
| *G06F 3/0482* | (2013.01) |
| *G06Q 10/10* | (2012.01) |

(52) U.S. Cl.
CPC .............. *G09G 5/12* (2013.01); *G09G 5/34* (2013.01); *G06F 3/0482* (2013.01); *G06Q 10/10* (2013.01); *G09G 2354/00* (2013.01); *G09G 2370/02* (2013.01); *G09G 2370/16* (2013.01); *G09G 2380/02* (2013.01); *H04B 1/385* (2013.01)

(58) Field of Classification Search
CPC .......... G06F 3/0482; G06G 5/12; G06G 5/34; G06G 2370/02; H04B 1/385
See application file for complete search history.

(56) References Cited

U.S. PATENT DOCUMENTS

| | | | |
|---|---|---|---|
| 6,556,222 B1 | 4/2003 | Narayanaswami | |
| 2002/0023057 A1* | 2/2002 | Goodwin | G06Q 30/02 705/50 |
| 2010/0105362 A1* | 4/2010 | Yang | G06F 3/0481 455/414.1 |
| 2011/0184772 A1 | 7/2011 | Norton | |
| 2011/0289443 A1* | 11/2011 | Heaven | G06Q 10/06398 715/772 |

(Continued)

*Primary Examiner* — Sherrod L Keaton
(74) *Attorney, Agent, or Firm* — Temmerman Law Office; Mathew J. Temmerman

(57) ABSTRACT

A system and method for managing action items over a network comprises a wearable computing device, a first communication device and a second communication device. The wearable computing device displays a plurality of action groups wherein each action group comprises a plurality of action items. The second communication device is configured to allow a user to send an action item associated to an action group to the first communication device. A processor installed with an action management application enables the user to access, manage and update the action item associated to the action group. A user interface controller in communication with the display unit and the processor is configured to allow the user to approve and reject the action item associated to the action group and press the screen with a small amount of force to activate a context menu to approve and reject all action items simultaneously.

11 Claims, 14 Drawing Sheets

(56) References Cited

U.S. PATENT DOCUMENTS

2014/0337748 A1* 11/2014 Lee .................. G06F 3/1454
                                                                  715/740
2015/0111603 A1    4/2015  Rivard et al.
2015/0112749 A1* 4/2015  Erdal ................ G06F 3/04842
                                                                  705/7.19

* cited by examiner

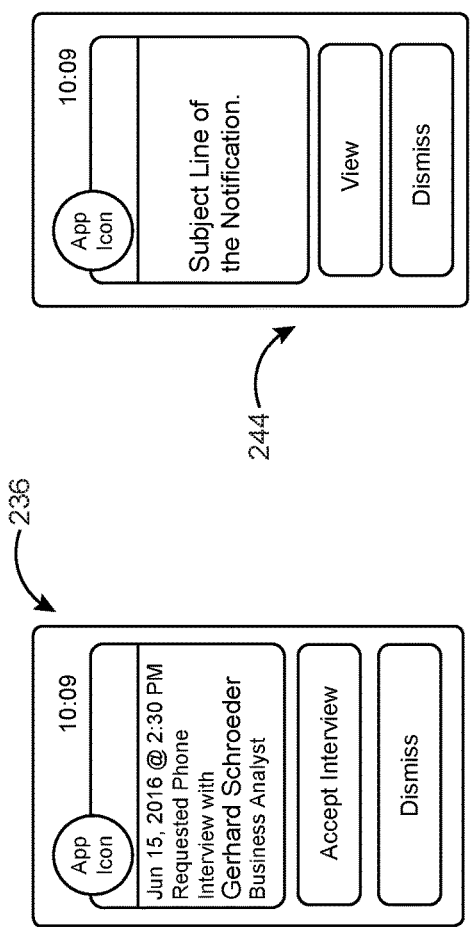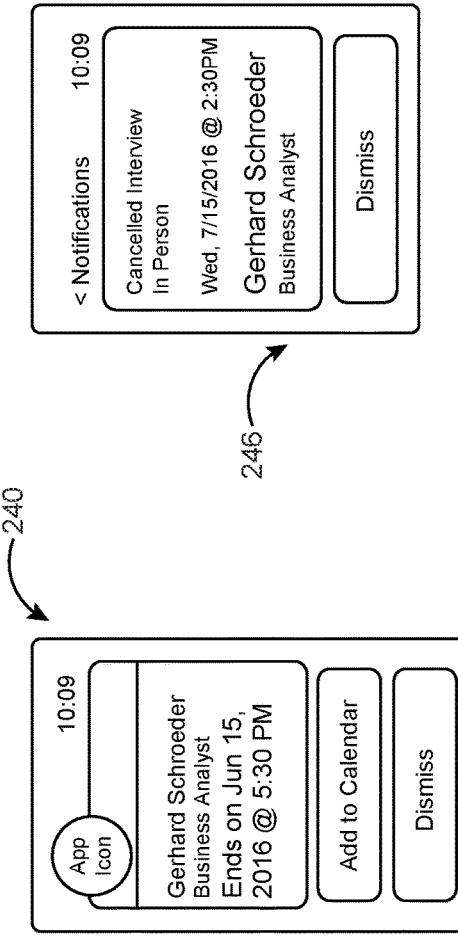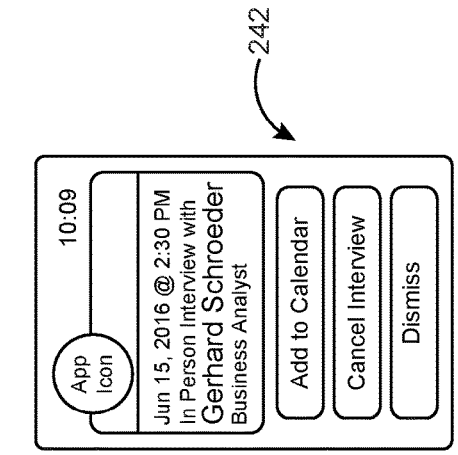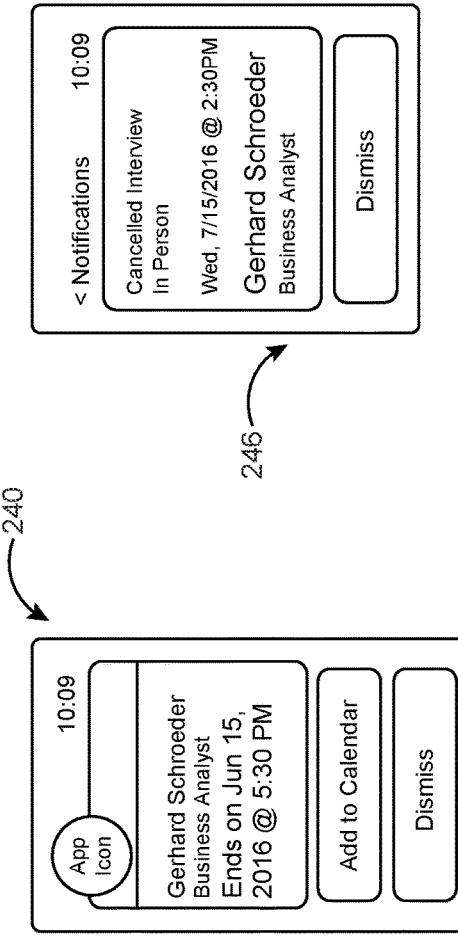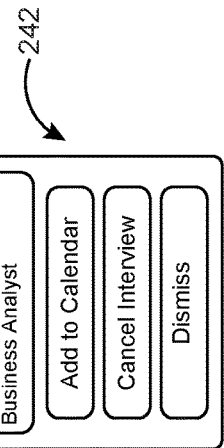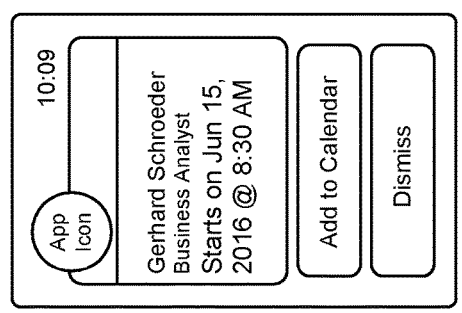

FIG. 8B

< Time Card  10:09
Week Ending Sun, 04/10/16
Robert De Niro
<Title>
Daily
2 d    $2,000.00
[Approved]

< Time Card  10:09
Week Ending Sun, 04/10/16
Robert De Niro
<Title>
Daily
2 d    $2,000.00
[Approve]
[Reject]

< Expense  10:09
Week Ending Sun, 04/10/16
Walter Workinabe
Sr. Software developer
Travel
$756.69
Approve
Reject

< Expense  10:09
Week Ending Sun, 04/10/16
Walter Workinabe
Sr. Software developer
Travel
$756.69
Approved

< Request 10:09

Headcount Approval

4 Position approval for
Sr. Software Dev.

Est. Total Cost
$98,000.00

Approved

FIG. 11B

< Request 10:09

Headcount Approval

4 Position approval for
Sr. Software Dev.

Est. Total Cost
$98,000.00

Approve

Reject

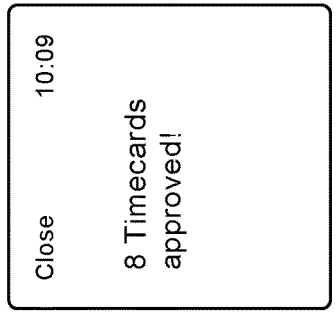
FIG. 13D
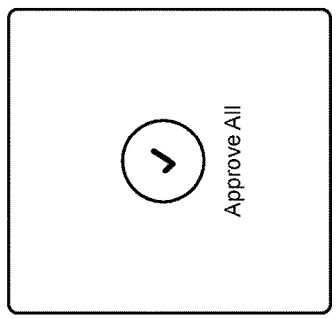
FIG. 13C
FIG. 13B
FIG. 13A

< Time Card    10:09

Week Ending Sun, 04/10/16

Robert De Niro
<Title>
Daily
2 d        $2,000.00

Approve

Reject

FIG. 14A

< Time Card    10:09

Week Ending Sun, 04/10/16

Robert De Niro
<Title>
Daily
2 d        $2,000.00

Rejected

FIG. 14B

Cancel         10:09

Now, Use Your First Communication Device to Complete Rejection of this Action Item

FIG. 14C

SYSTEM AND METHOD FOR MANAGING ACTION ITEMS

RELATED APPLICATIONS

This application claims priority from the United States provisional application with Ser. No. 62/160,165, which was filed on May 12, 2015. The disclosure of that provisional application is incorporated herein as if set out in full.

BACKGROUND OF THE DISCLOSURE

Technical Field of the Disclosure

The present embodiment relates in general to smart watches. More specifically, the present disclosure relates to a system and method for managing at least one action item over a network.

Description of the Related Art

Wearable computers or body-borne computers are miniature electronic devices capable of communicating, storing, processing and displaying data. Such wearable computers are designed to incorporate into a person's clothing or personal accessories. These computers are specially designed for applications where complex computational support and information processes are required. The wearable computers are generally designed in the form of smart watches, but other apparel capable of computation and interacting with the wearer are envisioned as well. The main features of the wearable computer are consistency and multitasking which enable the wearer to take and view pictures or videos, read text messages and emails, update calendars, respond to voice commands, browse the web and more.

A wide variety of wearable computers have been developed in the art. Among them, head-mounted displays and wrist-mounted smart watches are commonly used. Certain smart watches having a band unit that is configured to be worn on a user's wrist, an image capture device disposed on the band unit, a power source coupled to the image capture device, a memory unit coupled to the image capture device, and a motion detector coupled to the memory.

Attempts have been made to add more and more functionality to smart watches and other wearable technology, including the ability to run mobile applications, to act as portable media players and also to function as watch phones configured to make and answer phone calls. These conventional smart watches are generally not readily adaptable to organize complex business related meetings and to fully track one's daily activities as they relate to the business world.

Some conventional wearable mobile computing wrist watches include a high resolution display that is capable of wirelessly accessing information from a network and a variety of other devices. These mobile computing wrist watches include a user interface that is used to efficiently interact with alarms and notifications on the watch. Even so, such computing wristwatches are not designed for managers or employers of a company to approve or reject action items of their employees to organize and up-to-date one's daily activities efficiently for developing business.

Another disadvantage of these smart watches is that even if they provide notifications the smart watches are generally not configured to view all the notifications by scrolling the screen and approve those notifications simultaneously.

In light of the foregoing discussion, there is a need for a system and method that would manage at least one action item over a network. This needed system would include a wearable computing device that is configured to display a plurality of action groups based on a type of action. Such a method would enable a user to access, manage and update at least one action item of at least one action group. Moreover, this system would be utilized by managers/employers of a company to approve or reject action items of their employees to organize and up-to-date one's daily activities efficiently for developing business. Further, this system would track one's daily activities and would organize business meetings. Moreover, the needed system would be configured to view all notifications by scrolling the screen while simultaneously approving those notifications. The present embodiment accomplishes these objectives.

SUMMARY OF THE DISCLOSURE

To minimize the limitations found in the prior art, and to minimize other limitations that will be apparent upon the reading of this specification, a preferred embodiment of the present invention provides a system for managing at least one action item over a network. The system comprises a wearable computing device that is operatively coupled to a first communication device via the network. The network may provide for wired/wireless, or a combination of wired and wireless communication between the wearable computing device, the at least one first communication device and the at least one second communication device. The network in some embodiments includes the Internet but can also include local networks to the user.

The wearable computing device includes a display unit having a touch sensitive display screen. The wearable computing device includes, but is not limited to, smart watches, bracelets, cuffs, rings, glasses, pendants, brooches, headbands and hair accessories, pocket chains, and anklets. The wearable computing device includes a processor coupled with a memory unit which is integrated to and with a central database. The display unit is configured to display a textual and graphical representation of a plurality of action groups on the touch sensitive display screen. Each action group of the plurality of action groups includes a plurality of action items. The plurality of action groups may include a notification group, a timecard group, an expense group, a project billing group, a request group and a change group. The processor is installed with an action management application that is compatible with the at least one first communication device. The action management application enables a user to access, manage and update at least one action item of the plurality of action items associated to at least one group of the plurality of action groups.

A user interface controller is in communication with the display unit and the processor. The user interface controller is configured to allow the user to approve and reject the at least one action item associated to the at least one action group received in the first communication device. The user interface controller allows the user to press the touch sensitive display screen with a small amount of force to activate a context menu to approve all the plurality of action items associated to the at least one action group simultaneously. Once the context menu is activated and the plurality of action items are approved, a confirmation message with the number of the plurality of action items approved is displayed on the wearable computing device.

At least one second communication device in communication with the first communication device is configured to allow the user to send the at least one action item associated to the at least one action group to the first communication device. The first communication device and the at least one second communication device are any mobile communication device, such as a cellular telecommunications device (i.e., a cell phone or a mobile phone), personal digital assistant (PDA), a mobile Internet accessing device, or other mobile device including, but not limited to table computers, desktop computers, laptop computers, cameras, video recorders, audio/video player, global positioning system (GPS) devices, any combination of the aforementioned devices.

In the preferred embodiment, the system initiates an electronic communication between the wearable computing device and the first communication device. The first communication device communicates notification, expense, time, request, project billing and changes to the wearable computing device. The wearable computing device can then display or otherwise output the communication to the user. The user dismisses the notification or performs one of a set of pre-defined actions in response to the notification. The user can accept or reject the expense, time, project billing, request or changes. The response to the notification and the accept message or reject message are communicated to the first communication device and then to the at least one second communication device via the network.

Initially, the user may log in to the action management application using the first communication device. The login process may request the user to enter specific authentication information, such as PIN/password, user name, phone number, biometric identification such as thumbprint, etc. The user inputs the requested information to connect the first communication device to the wearable computing device. The user launches to the action management application residing on the first communication device through the user interface controller of the wearable computing device. The wearable computing device shows an overview screen 204 that displays a number of pending action items. When the user taps on the number of pending action items, the overview screen 204 navigates to a home screen which displays the plurality of action groups. The plurality of action groups includes number of notifications, number of time cards, number of expenses, number of project billings, number of requests and number of changes.

When the user taps on the number of notification, the home screen navigates to a screen showing a list of notifications. The user can tap on at least one notification which contains add to calendar option, cancel option and the dismiss option provided along with details of a person participating in the notification. When the user taps on the add to calendar, the wearable computing device adds the notification to the calendar displaying a confirmation message "Notification added to your calendar". If the user taps on the cancel option, then the wearable computing device prompts the user to again confirm the cancellation action and if the user cancels the notification a confirmation message "Notification cancelled" is displayed and then returns the user to the home screen. If the user taps on the dismiss option, the wearable computing device closes the window and returns to the list of notifications. Preferably, the most recent notification is displayed on the top with higher priority in the list of the notifications.

When the user taps on the number of time cards, the home screen navigates to a screen showing a list of time cards. In the time card screen, details of time cards are displayed and the user can choose an option to approve the time card or an option to reject the time card. When the user taps on the number of expenses, the home screen navigates to a screen showing a list of expenses. In the expense screen, details of expenses are displayed and the user can choose an option to approve the expense or an option to reject the expense. When the user taps on the number of project billings, the home screen navigates to a screen showing a list of project billings. In the project billing screen, details of project billings are displayed and the user can choose an option to approve the project billing or an option to reject the project billing. When the user taps on the number of requests, the home screen navigates to a screen showing a list of requests. In the request screen, details of requests are displayed and the user can choose an option to approve the request or an option to reject the request. Similarly, when the user taps on the number of changes, the home screen navigates to a screen showing a list of changes. In the change screen, details of changes are displayed and the user can choose an option to accept the change or an option to reject the change. When the user rejects the time card, the expense, the project billing, the request and the changes, a rejection handoff screen is displayed and the user has to then utilize the first communication device to complete the rejection process.

A first objective of the present invention is to provide a system that includes a wearable computing device that is configured to connect with at least one communication device.

A second objective of the present invention is to provide a system and method for managing at least one action item over a network.

A third objective of the present invention is to provide a system and method that includes a wearable computing device that is configured to display a plurality of action groups based on a type of action.

A fourth objective of the present invention is to provide a system and method that enable a user to access, manage and update at least one action item of at least one action group.

Another objective of the present invention is to provide a system that is utilized by managers/employers of a company to approve or reject action items of their employees to organize and keep up-to-date one's daily activities efficiently.

Another objective of the present invention is to provide a system that tracks one's daily activities and organizes business meetings.

Yet another objective of the present invention is to provide a system including a user interface controller that allows the user to press a touch sensitive display screen with a small amount of force to activate a context menu to approve all the plurality of action items associated to at least one action group simultaneously.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

FIGS. 6B through 6G illustrate example screens for each notification in the list of notifications shown in FIG. 2 in accordance with the preferred embodiment of the present invention;

FIGS. 8A and 8B illustrate exemplary screens displaying a timecard in the wearable computing device in accordance with the preferred embodiment of the present invention;

FIGS. 9A and 9B illustrate exemplary screens displaying an expense in the wearable computing device in accordance with the preferred embodiment of the present invention;

FIGS. 10A and 10B illustrate exemplary screens displaying a project billing in the wearable computing device in accordance with the preferred embodiment of the present invention;

FIGS. 11A and 11B illustrate exemplary screens displaying a request in the wearable computing device in accordance with the preferred embodiment of the present invention;

FIGS. 12A and 12B illustrate exemplary screens displaying a change in the wearable computing device in accordance with the preferred embodiment of the present invention;

FIGS. 13A through 13D illustrate exemplary screens displaying approval of all timecards simultaneously in accordance with the preferred embodiment of the present invention; and FIGS. 14A through 14C illustrate exemplary screens displaying rejection of the time card in accordance with the preferred embodiment of the present invention.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term "about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
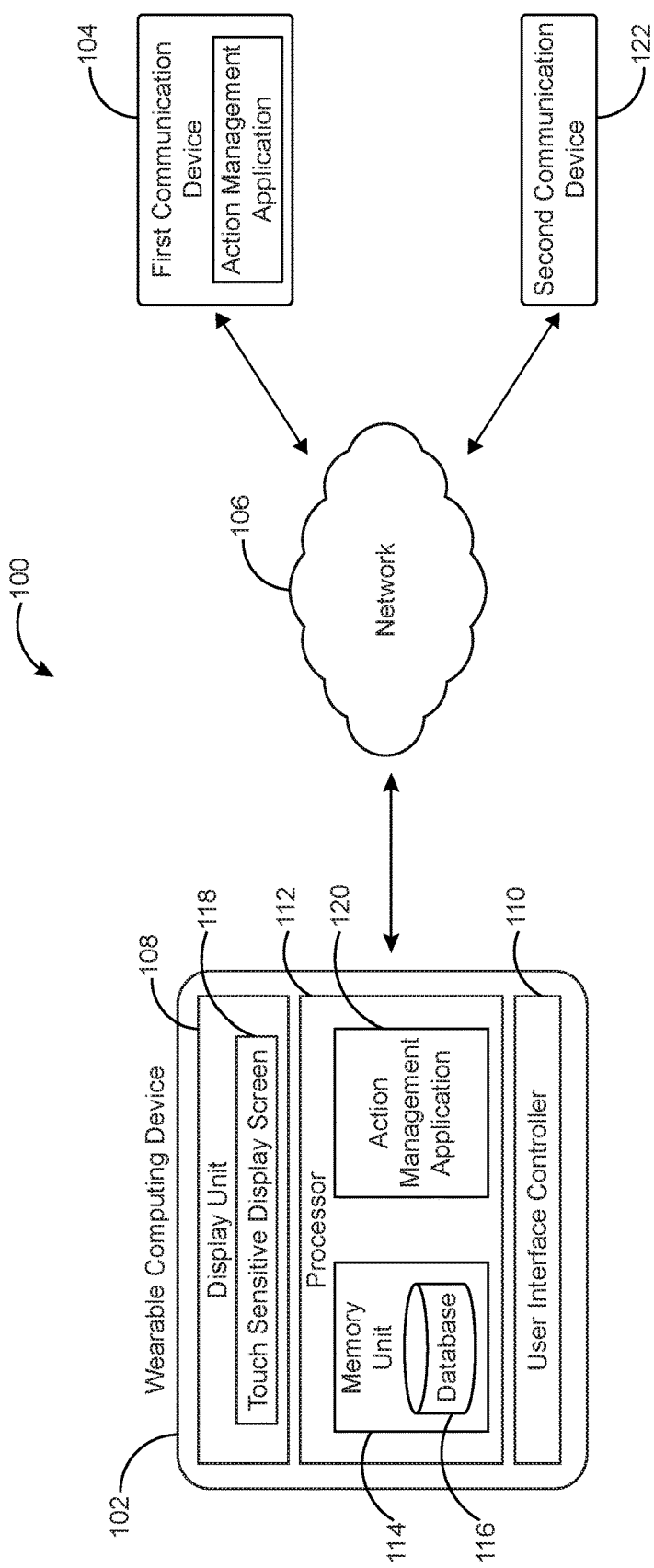
FIG. 1 illustrates a functional block diagram of a system for managing at least one action item over a network in accordance with the preferred embodiment of the present invention.

Turning first to FIG. 1, a functional block diagram of a system for managing at least one action item over a network in accordance with the preferred embodiment of the present invention is illustrated. The system 100 comprises a wearable computing device 102 that is operatively coupled to a first communication device 104 via the network 106. The network 106 is well known in the art, and is implemented using any number of wireless communication standards. The network 106 includes Global System for Mobile Communications (GSM), General Packet Radio Service (GPRS), Code Division Multiple Access (CDMA), Evolution-Data Optimized (ED-VO), Enhanced Data Rates for GSM Evolution (EDGE), 3GSM, Digital Enhanced Cordless Telecommunications (DECT), Digital AMPS (IS-136/TDMA) and Integrated Digital Enhanced Network (iDEN), and other suitable standards not listed here be. The invention is not limited in this regard as the solution described herein may be extended to operate in one or more of these or another type of network.

The first communication device 104 is any mobile communication device, such as a cellular telecommunications device (i.e., a cell phone or a mobile phone), personal digital assistant (PDA), a mobile Internet accessing device, or other mobile device including, but not limited to tablet computers, desktop computers, laptop computers, digital cameras, video recorders, audio/video players, radios, global positioning system (GPS) devices, and any combination of the aforementioned devices.

The wearable computing device 102 includes a display unit 108 having a touch sensitive display screen 118. The wearable computing device 102 includes, but is not limited to, smart watches, bracelets, cuffs, rings, glasses, pendants, brooches, headbands and hair accessories, pocket chains, and anklets. The wearable computing device 102 is equipped with input means such as at least one touchscreen, buttons or keys, accelerometers, a gyroscope, an image capture device, and a microphone. The wearable computing device 102 includes a processor 112 coupled with a memory unit 114 which is integrated with a central database 116.

The display unit 108 is configured to display a textual and graphical representation of a plurality of action groups on the touch sensitive display screen 118. Each action group of the plurality of action groups includes a plurality of action items. The plurality of action groups includes a notification group, a timecard group, an expense group, a project billing group, a request group and a change group. The processor 112 is installed with an action management application 120 that is compatible with the first communication device 104. The action management application 120 enables a user to access, manage and update at least one action item of the plurality of action items associated to at least one action group of the plurality of action groups.

The wearable computing device 102 further includes a user interface controller 110 that is in communication with the display unit 108 and the processor 112. The user interface controller 110 is configured to allow the user to approve and reject the at least one action item associated to the at least one action group received in the first communication device 104. For example, these action items include receiving scheduled alerts, receiving confirmation of time, receiving confirmation of expense, receiving confirmation of project billing, or displaying action items based on a time. The user, using any type of input means of the wearable computing device 102 such scroll button or touch sensitive label, manages active alerts (e.g., accept, reject, dismiss or snooze), taps an action item to approve and moves on to next action items by tapping or navigating and confirms another action item.

The system 100 further comprises at least one second communication device 122 that is in communication with the first communication device 104. The at least one second communication device 122 is configured to allow the user to send the at least one action item associated to the at least one action group to the first communication device 104.

The at least one second communication device 122 is any mobile communication device, such as a cellular telecommunications device (i.e., a cell phone or a mobile phone), personal digital assistant (PDA), a mobile Internet accessing device, or other mobile device including, but not limited to table computers, desktop computers, laptop computers, cameras, video recorders, audio/video player, radio, global positioning system (GPS) devices, any combination of the aforementioned devices.

In one embodiment, the at least one second communication device 122 is any wearable device such as a smart watch.

In the preferred embodiment, the system 100 initiates an electronic communication between the wearable computing device 102 and the first communication device 104. The first communication device 104 communicates notification, expense, time, request, project billing and changes to the wearable computing device 102. The wearable computing device 102 can then display or otherwise output the communication to the user. The user dismisses the notification or performs one of a set of pre-defined actions in response to the notification. The user can accept or reject the expense, time, project billing, request or changes. The response to the notification and the accept message or reject message are communicated to the first communication device 104 and then to the at least one second communication device 122 via the network 106.

Referring to FIG. 1, the network 106 may include a local area network (LAN), a wide area network (WAN), and/or a global area network (GAN). The network 106 may provide for wired/wireless, or a combination of wired and wireless communication between the wearable computing device 102, the first communication device 104 and the at least one second communication device 122. The network 106, in some embodiments, includes the Internet.

In some embodiments, the wearable computing device 102 shown in FIG. 1 incorporated into the networked system 100 can additionally, or alternatively, be incorporated into a personal computing device or a wearable device of the user.

In one embodiment, the wearable computing device 102 is utilized by the user in conjunction with another personal computing device, such as a mobile device (e.g., a smartphone), a tablet computer, a netbook, a laptop computer, a set-top box for a television, or a gaming console.

In one embodiment, the wearable computing device 102 may include components including but not limited to a processor (which may run/execute an operating system and applications for the device, and/or perform other functionality), a memory device and/or storage device (which may be coupled to the processor and which may store the operating system, applications, and related data), and a wireless interface (for communicating wirelessly with other wireless devices, using Bluetooth and/or other wireless technologies). The wearable computing device 102 may also include and/or be connected to a display device (e.g., a Liquid Crystal Display (LCD) or Light-Emitting Diode (LED) display, or other type of display device).

In one embodiment, the first communication device 104 and the wearable computing device 102 are associated to a manager or employer of a company. The manager or employer can approve or reject at least one action item easily using the wearable computing device 102. In one embodiment, the at least one second communication device 122 is associated to an employee of the company. The employee can send the at least one action item for the approval of the manager or employer via the at least one second communication device 122.

In one embodiment, the at least one second communication device 122 is directly connected to the wearable computing device 102 via the network 106. The updates in the wearable computing device 102 is communicated to the at least one second communication device 122.

The processor 112 is an electronic circuit that executes computer programs. The memory unit 114 stores programs, applications, and data. For example, the action management application 120 is stored on the memory unit 114 of the wearable computing device 102. The memory unit 114 is, for example, a random access memory (RAM) or another type of dynamic storage device that stores information and instructions for execution by the processor 112. The memory unit 114 also stores temporary variables and other intermediate information used during execution of the instructions by the processor 112. The wearable computing device 102 further comprises a read only memory (ROM) or another type of static storage device that stores static information and instructions for the processor 112. The wearable computing device 102 that executes the action management application 120 communicates with the first communication device 104 through the network 106. The network 106 is, for example, a local area network (LAN), a wide area network, a mobile communication network, a signaling system number 7 (SS7) network, a wired telephony network, any generic data network, etc.

The wearable computing device 102 employs an operating system for performing multiple tasks. The operating system is responsible for management and coordination of activities and sharing of resources. The operating system further manages security, peripheral devices connected to the wearable computing device 102, and network connections. The operating system recognizes keyboard inputs and pointing device inputs of an operator, output display, files, and directories stored. The operating system on the wearable computing device 102 executes different programs, for example, a web browser, an electronic mail (email) application, a customized program, etc., initiated by the operators of the action management application 120 using the processor 112. The operating system monitors the use of the processor 112. The processor 112 retrieves the instructions for executing the instructions of the action management application 120 from the program memory in the form of signals. A program determines the location of the instructions of the action management application 120 in the program memory.

The instructions fetched by the processor 112 from the program memory after being processed are decoded. The instructions are placed in an instruction register (IR) in the processor 112. After processing and decoding, the processor 112 executes the instructions. For example, the action management application 120 defines instructions to approve or reject the at least one action item associated to the at least one action group. At the time of execution, the instructions stored in the instruction register are examined to determine the operations to be performed. The operations include arithmetic and logic operations. The processor 112 then performs the specified operations. The operating system performs multiple routines for performing a number of tasks required to assign the input devices, the output devices, and memory for execution of the instructions of the action management application 120. The tasks performed by the operating system comprise assigning memory to each component, moving data between the memory unit 114 and disk units, and handling input/output operations. The operating system performs the tasks on request by the operations and after performing the tasks, the operating system transfers the execution control back to the processor 112. The processor 112 continues the execution to obtain one or more outputs. The outputs of the execution of the instructions of the action management application 120 are displayed, for example, to the operators of the action management application 120.

Disclosed herein is also a computer program product comprising computer executable instructions embodied in a non-transitory computer readable storage medium. As used herein, the term "non-transitory computer readable storage medium" refers to all computer readable media, for example, non-volatile media such as optical disks or magnetic disks, volatile media such as a register memory, processor cache, etc., and transmission media such as wires that constitute a system bus coupled to the processor 112, except for a transitory, propagating signal. The computer program product disclosed herein comprises one or more computer program codes for managing the actions items.

Figure 2:
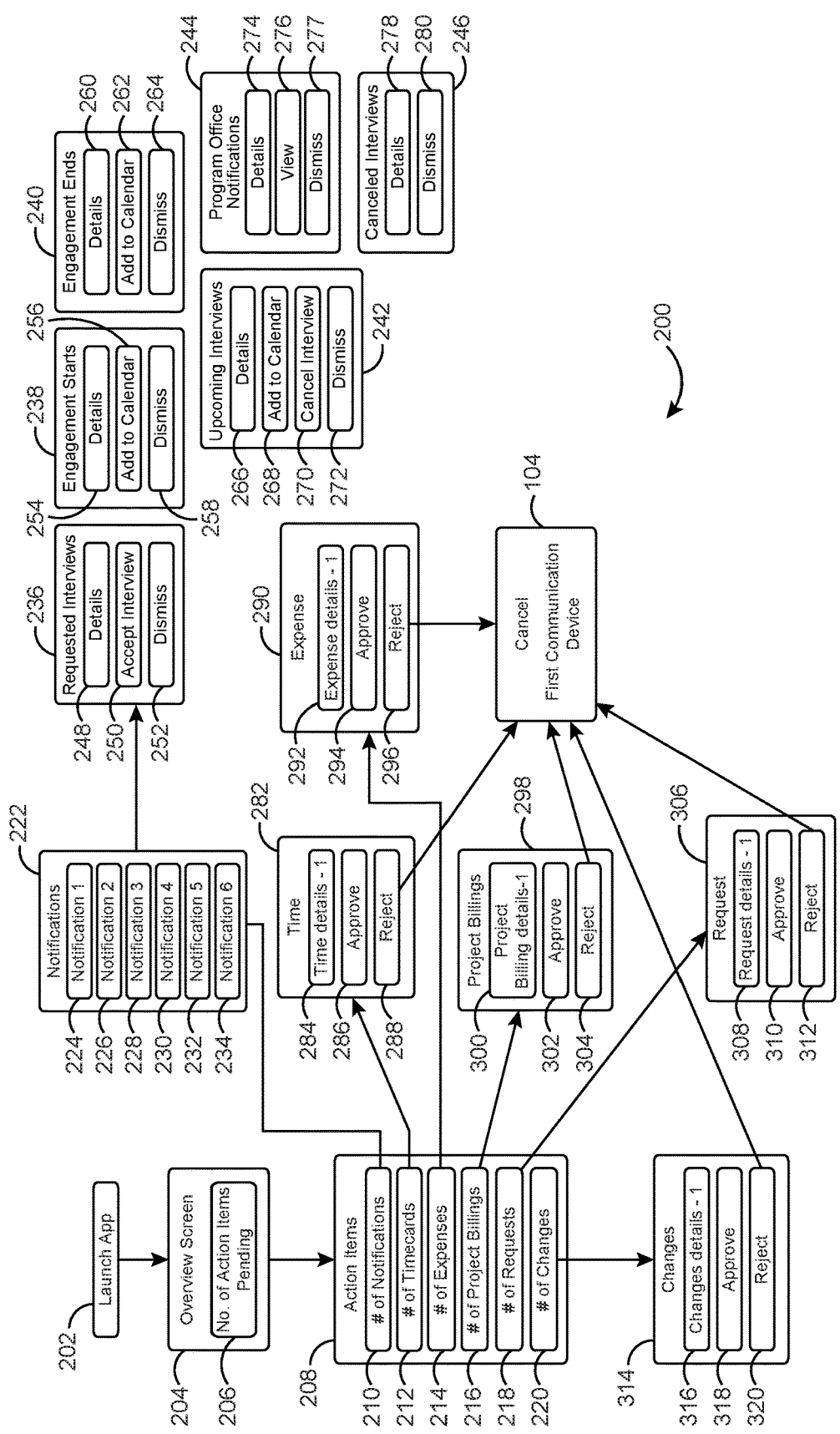
FIG. 2 illustrates a flow diagram of the system for managing the at least one action item over the network in accordance with the preferred embodiment of the present invention.

FIG. 2 illustrates a flow diagram 200 of the system for managing the at least one action item over the network in accordance with the preferred embodiment of the present invention. Initially, the user may log in to the action management application 120 using the first communication device 104. The login process requests the user to enter specific authentication information, such as PIN/password, user name, phone number, biometric identifier such as thumb print, etc. The user enters the requested information to connect the first communication device 104 to the wearable computing device 102. The wearable computing device 102 processes the information to authenticate the user. For example, the wearable computing device 102 determines whether an active account exists with the wearable computing device 102 corresponding to the user and the information provided by the user. The user launches to the action management application 120 residing on the first communication device 104 through the user interface controller 110 of the wearable computing device 102 as indicated at block 202. As indicated at block 204, the wearable computing device 102 shows an overview screen that displays number of pending action items as indicated at block 206. When the user taps on the number of pending action items 206, the overview screen 204 navigates to a home screen as indicated at block 208 which displays the plurality of action groups along with the corresponding counts. The plurality of action groups includes number of notifications 210, number of time cards 212, number of expenses 214, number of project billings 216, number of requests 218 and number of changes 220. The symbol # represents the count of the action items in each action groups.

When the user taps on the number of notification 210, the home screen 208 navigates to a screen showing a list of notifications (e.g., notification 1 224, notification 2 226, notification 3 228, notification 4 230, notification 5 232 and notification 6 234) as indicated at block 222. For example, when the user taps on notification 1 224, the screen navigates to a screen that displays requested interviews as indicated at block 236, when the user taps on notification 2 226, the screen navigates to a screen that displays engagement start notifications as indicated at block 238, when the user taps on notification 3 228, the screen navigates to a screen that displays engagement end notifications as indicated at block 240, when the user taps on notification 4 230, the screen navigates to a screen that displays upcoming interviews as indicated at block 242, when the user taps on notification 5 232, the screen navigates to a screen that displays program office notifications as indicated at block 244 and when the user taps on notification 6 234, the screen navigates to a screen that displays canceled interviews as indicated at block 246.

In the requested interviews screen 236, details of particular candidates are shown as indicated at block 248 and the user can choose an option at block 250 to accept the interviews or an option at block 252 to dismiss the scheduled interviews. In the engagement start notifications screen 238, details of engagements are shown as indicated at block 254 and the user can choose an option at block 262 to add starting details of the engagements to calendar or an option at block 264 to dismiss the engagements. In the engagement ends screen 240, details of engagements are shown as indicated at block 260 and the user can choose an option at block 262 to add ending details of the engagements to the calendar or an option at block 264 to dismiss the engagements.

In the upcoming interviews screen 242, details of particular candidates are shown as indicated at block 266 and the user can choose an option at block 268 to add details of the interviews to the calendar, or an option at block 270 to cancel the interviews or an option at block 272 to dismiss the scheduled interviews. In the program office notification screen 244, details of program office notifications are shown as indicated at block 274 and the user can choose an option at block 276 to view the program office notifications or an option at block 277 to dismiss the program office notifications. In the canceled interview screen 246, details of the canceled interviews are shown as indicated at block 278 and the user can choose an option at block 280 to dismiss the canceled interviews.

When the user taps on the number of time cards 212, the home screen 208 navigates to a screen showing a list of time cards (e.g., time card 1) as indicated at block 282. In the time card screen 282, details of time cards are shown as indicated at block 284 and the user can choose an option at block 286 to approve the time card or an option at block 288 to reject the time card. When the user taps on the number of expenses 214, the home screen 208 navigates to a screen showing a list of expenses (e.g., expense 1) as indicated at block 290. In the expense screen 290, details of expenses are shown as indicated at block 292 and the user can choose an option at block 294 to approve the expense or an option at block 296 to reject the expense. The details of the expenses at block 290 include travel, non-travel and project expenses.

When the user taps on the number of project billings 216, the home screen 208 navigates to a screen showing a list of project billings (e.g., project billing 1) as indicated at block 298. In the project billing screen 298, details of project billings are shown as indicated at block 300 and the user can choose an option at block 302 to accept the project billing or an option at block 304 to reject the project billing. When the user taps on the number of requests 218, the home screen 208 navigates to a screen showing a list of requests (e.g., requests 1) as indicated at block 306. In the request screen 306, details of requests are shown as indicated at block 308 and the user can choose an option at block 310 to approve the request or an option at block 312 to reject the request. The details of the requests at block 306 include headcount and financial requests.

When the user taps on the number of changes 220, the home screen 208 navigates to a screen showing a list of changes (e.g., changes 1) as indicated at block 314. In the change screen 314, details of changes are shown as indicated at block 316 and the user can choose an option at block 318 to accept the change or an option at block 320 to reject the change. The details of the changes at block 314 includes changes in order, changes in requisition threshold and changes in time and expenses. When the user rejects the time card at block 282, the expense at block 290, the project billing 298, the request 306 and the changes 314, the user has to utilize the first communication device 104 to complete the rejection process.

Figure 3:
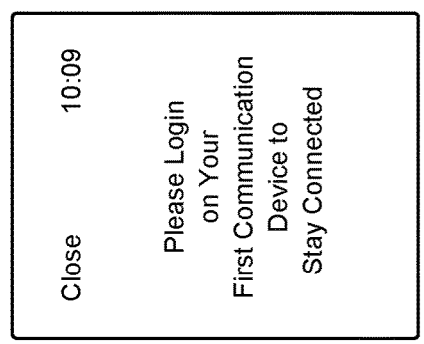
FIG. 3 illustrates a touch sensitive display screen of a wearable computing device displaying a message when the wearable computing device is not connected with a first communication device in accordance with the preferred embodiment of the present invention.

FIG. 3 illustrates the touch sensitive display screen 118 of the wearable computing device 102 displaying a message when the wearable computing device 102 is not connected with the first communication device 104 in accordance with the preferred embodiment of the present invention. When the wearable computing device 102 is not connected to the first communication device 104, the first communication device 104 displays a message indicating the user to log in to his/her user account to stay connected with the wearable computing device 102.

Figure 4:
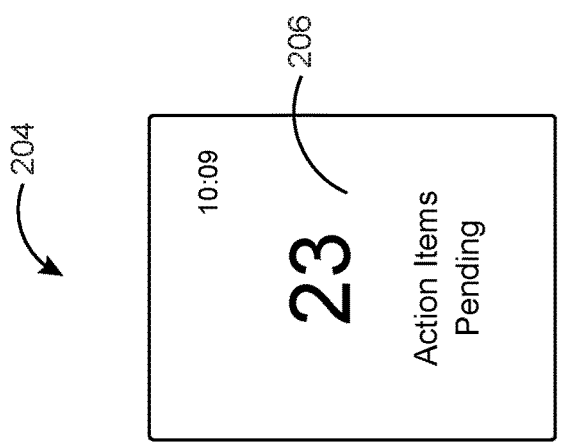
FIG. 4 illustrates an overview screen displayed in the wearable computing device in accordance with the preferred embodiment of the present invention.

FIG. 4 illustrates the overview screen 204 for the wearable computing device 102 in accordance with the preferred embodiment of the present invention. The overview screen 204 provides number of the pending action items 206. The user can tap on the number of pending action items 206 to navigate to the home screen 208 where the user will be provided with the plurality of action groups with the count of each action group. If no pending action items are displayed, then the overview screen 204 displays "zero" in the overview screen 204.

Figure 5:
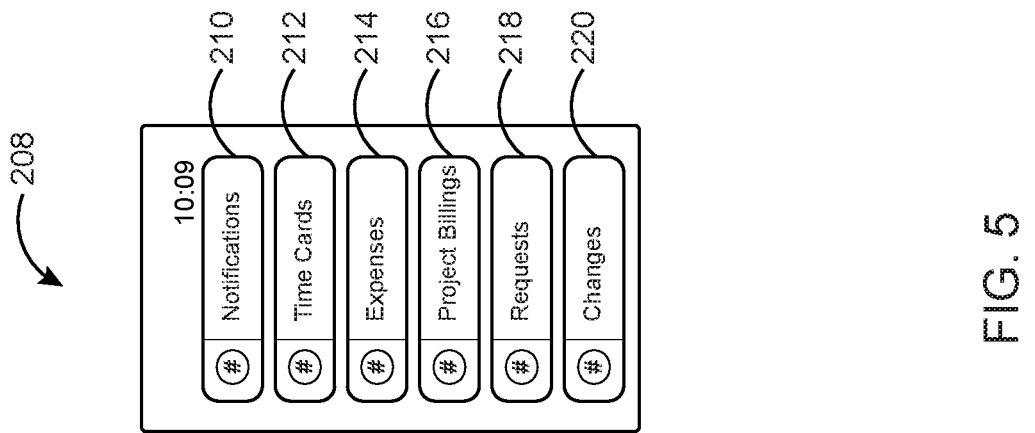
FIG. 5 illustrates a home screen displayed in the wearable computing device in accordance with the preferred embodiment of the present invention.

FIG. 5 illustrates the home screen 208 in the wearable computing device 102 in accordance with the preferred embodiment of the present invention. The home screen 208 is configured to display the plurality of action groups with the count of each action group. The plurality of action groups is formed based on a type of action. The plurality of action groups includes the notification group, timecard group, expense group, project billing group, request group and change group. The home screen 208 displays the number of notifications 210, the number of time cards 212, the number of expenses 214, the number of project billings 216, the number of requests 218 and the number of changes 220. The home screen 208 displays at least one action group, if there is any pending action item in that particular action group. For example, if no timecards to approve, then the home screen 208 does not display the time card group and if no notifications, then the home screen 208 does not display the notification group. When the user taps on each action group, the wearable computing device 102 navigates the user to the plurality of action items in that group where the user can respond to each action item. For instance, when the user taps on the number of notifications 210, the wearable computing device 102 navigates the user to the list of notifications. Preferably, the most recent notification is displayed on the top with higher priority in the list of the notifications. Similarly, when the user taps on the number of time cards 212, the number of expenses 214, the number of project billings 216, the number of requests 218 and the number of changes 220, the wearable computing device 102 navigates the user to the plurality of action items in each group where the user can either approve or reject the listed plurality of action items. The user can then scroll the pending action items vertically to review each action item and once the last action item of the action group is reviewed, then the wearable computing device 102 navigates the user again to the home screen 208.

Figure 6A:
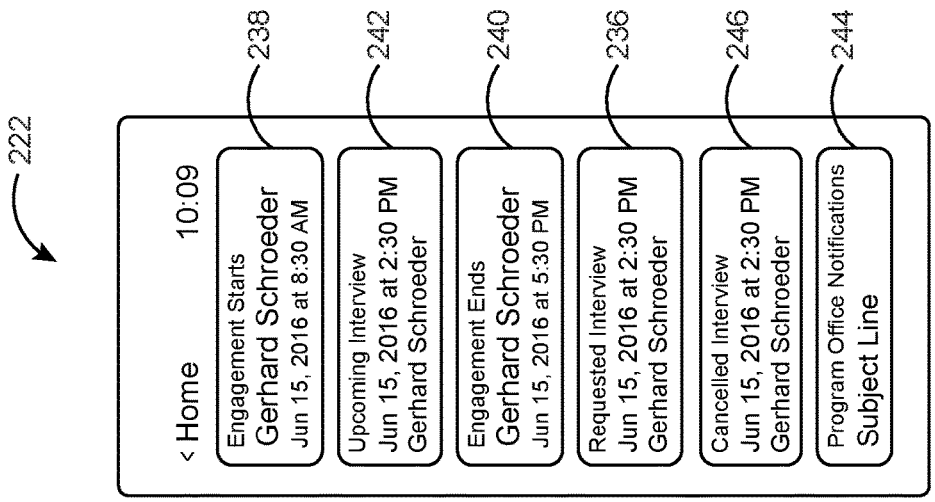
FIG. 6A illustrates an example screen showing a list of notifications depicted in FIG. 2 in accordance with the preferred embodiment of the present invention.

FIG. 6A illustrates an example screen showing the list of notifications 222 depicted in FIG. 2 in accordance with the preferred embodiment of the present invention. The most recent notification is displayed on the top with higher priority in the list of the notifications as shown in FIG. 6A. The user can only view one notification at a time and the user has to go back to the list of notifications to click on another notification to view the details of that particular notification. The list of notifications 222 may include the upcoming interviews 242, requested interviews 236, engagement start notifications 238, engagement end notifications 240, program office notifications 244 and canceled interviews 246.

FIGS. 6B through 6G illustrate example screens for each notification 236, 238, 240, 242, 244 and 246 in the list of notifications 222 shown in FIG. 2 in accordance with the preferred embodiment of the present invention. The user can add each notification to calendar or accept or cancel or dismiss according to the priority of each notification and convenience of the user.

Figure 7C:
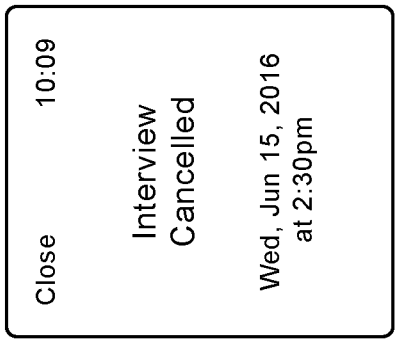
FIGS. 7B and 7C illustrate exemplary screens displaying cancellation messages of the upcoming interview in accordance with the preferred embodiment of the present invention.
Figure 7B:
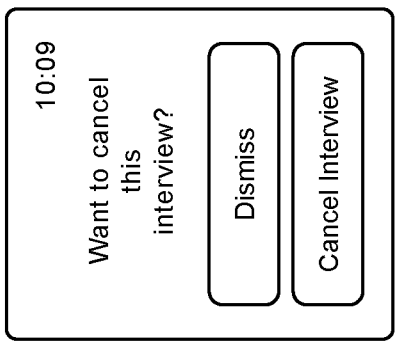
Figure 7A:
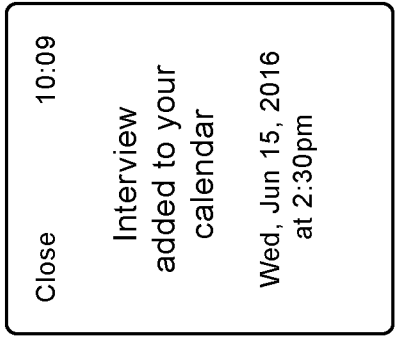
FIG. 7A illustrates an exemplary screen displaying a message when the upcoming interview shown in FIG. 6B is added to calendar by a user in accordance with the preferred embodiment of the present invention.

FIG. 7A illustrates an exemplary screen displaying a message when the upcoming interview 242 shown in FIG. 6B is added to calendar by the user in accordance with the preferred embodiment of the present invention. The add to calendar option 268, the cancel interview option 270 and the dismiss interview option 272 are provided along with details of a person 266 participating in the upcoming interviews 242. When the user taps on the add to calendar 268, the wearable computing device 102 adds the interview to the calendar displaying a confirmation message "Interview added to your calendar" as shown in FIG. 7A. If the user taps on the cancel interview option 270, then the wearable computing device 102 prompts the user to again confirm the cancellation action as shown in FIG. 7B and if the user cancels the interview a confirmation message "Interview cancelled" is displayed as shown in FIG. 7C and then return the user to the home screen 208. If the user taps on the dismiss option, the wearable computing device 102 closes the window and return to the list of notifications 222.

FIGS. 8A and 8B illustrate exemplary screens displaying a time card in the wearable computing device in accordance with the preferred embodiment of the present invention. When the user taps on the number of time cards 212 in the home screen 208, the wearable computing device 102 navigates the user to the time card 282 as shown in FIG. 8A. The user can view the pending time cards by scrolling vertically on the touch sensitive display screen 118. The user can approve or reject the time card 282 and when the user approves the time card 282, an approval message is displayed as shown in FIG. 8B. When the user rejects the time card 282, a rejection handoff screen is displayed and the user has to then utilize the first communication device 104 to complete the rejection process.

FIGS. 9A and 9B illustrate exemplary screens displaying an expense in the wearable computing device in accordance with the preferred embodiment of the present invention. When the user taps on the number of expenses 214 in the home screen 208, the wearable computing device 102 navigates the user to the expense 290 as shown in FIG. 9A. The user can view the pending expenses by scrolling vertically on the touch sensitive display screen 118. The user can approve or reject the expense 290 and when the user approves the expense 290, an approval message is displayed as shown in FIG. 9B. When the user rejects the expense 290, a rejection handoff screen is displayed and the user has to then utilize the first communication device 104 to complete the rejection process.

Figures 10A, 10B:
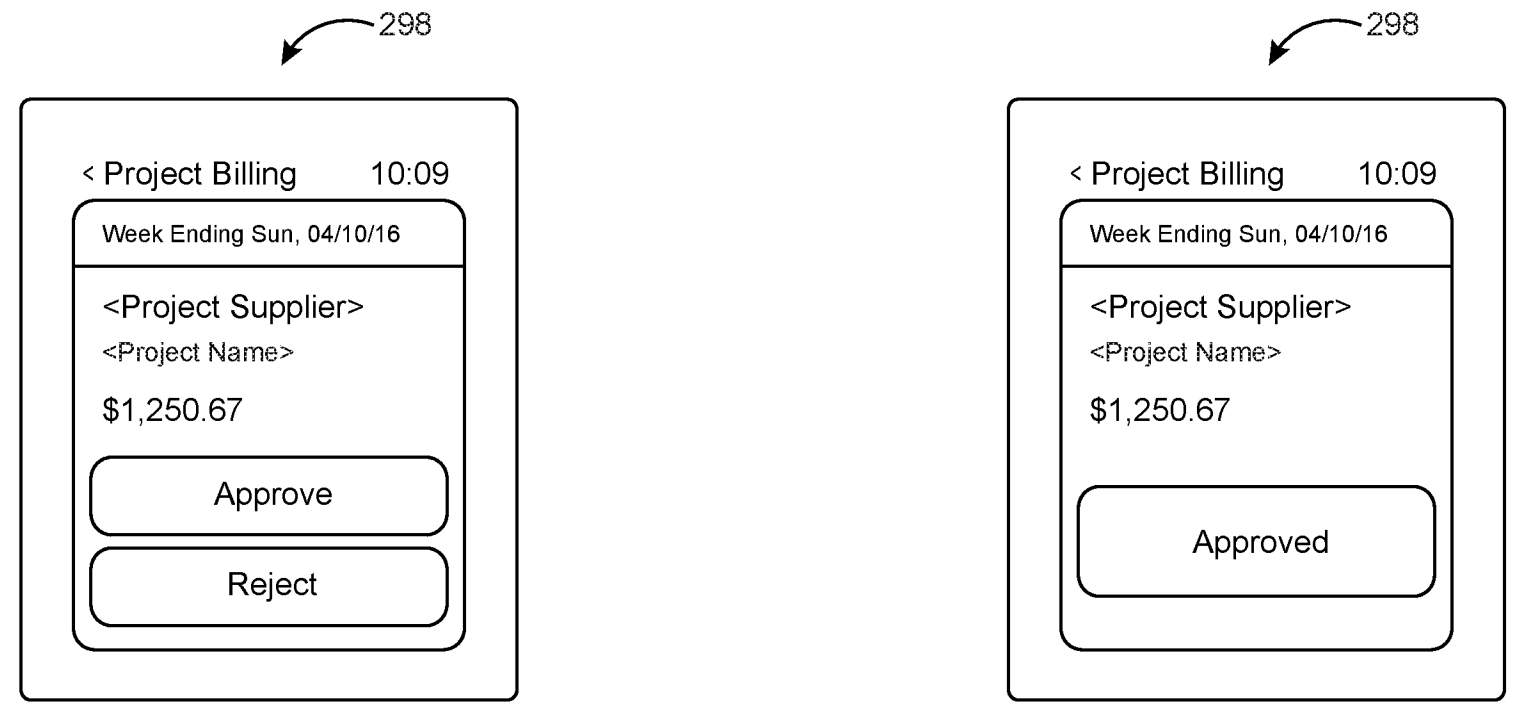

FIGS. 10A and 10B illustrate exemplary screens displaying project billing in the wearable computing device in accordance with the preferred embodiment of the present invention. When the user taps on the number of project billing 216 in the home screen 208, the wearable computing device 102 navigates the user to the project billing 298 as shown in FIG. 10A. The user can view pending project billings by scrolling vertically on the touch sensitive display screen 118. The user can approve or reject the project billing 298 and when the user approves the project billing 298, an approval message is displayed as shown in FIG. 10B. When the user rejects the project billing 298, a rejection handoff screen is displayed and the user has to then utilize the first communication device 104 to complete the rejection process.

FIGS. 11A and 11B illustrate exemplary screens displaying a request in the wearable computing device in accordance with the preferred embodiment of the present invention; When the user taps on the number of requests 218 in the home screen 208, the wearable computing device 102 navigates the user to the request 306 as shown in FIG. 11A. The user can view pending requests by scrolling vertically on the touch sensitive display screen 118. The user can approve or reject the request 306 and when the user approves the request 306, an approval message is displayed as shown in FIG. 11B. When the user rejects the request 306, a rejection handoff screen is displayed and the user has to then utilize the first communication device 104 to complete the rejection process.

Figures 12A, 12B:
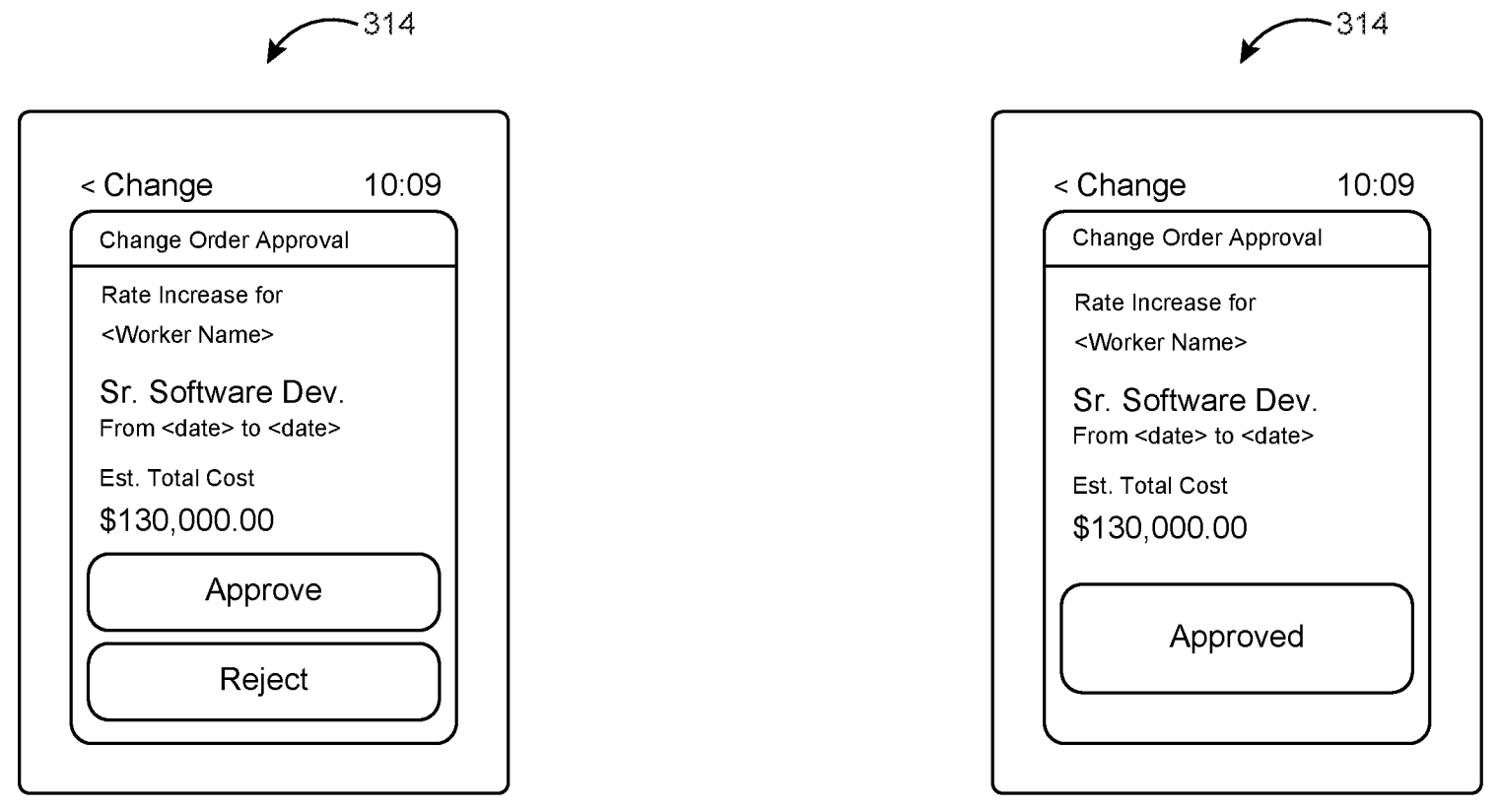

FIGS. 12A and 12B illustrate exemplary screens displaying a change in the wearable computing device in accordance with the preferred embodiment of the present invention. When the user taps on the number of change 220 in the home screen 208, the wearable computing device 102 navigates the user to the change 314 as shown in FIG. 12A. The user can view pending changes by scrolling vertically on the touch sensitive display screen 118. The user can approve or reject the change 314 and when the user approves the change 314, an approval message is displayed as shown in FIG. 12B. When the user rejects the change 314, a rejection handoff screen is displayed and the user must then utilize the first communication device 104 to complete the rejection process.

FIGS. 13A through 13D illustrate exemplary screens displaying approval of all timecards simultaneously in accordance with the preferred embodiment of the present invention. The wearable computing device 102 displays the current count of timecards with the options "approve all" and dismiss as shown in FIG. 13A. When the user taps on the option "approve all", all the time cards to be approved are listed as shown in FIG. 13B. The user interface controller 110 allows the user to press the touch sensitive display screen 118 with a small amount of force to activate a context menu to approve all the timecards associated to the timecard group simultaneously as shown in FIG. 13C. Once the context menu is activated and the time cards are approved, a confirmation message with the number of time cards approved is displayed on the wearable computing device 102 as shown in FIG. 13D.

FIGS. 14A through 14C illustrate exemplary screens displaying rejection of the time card in accordance with the preferred embodiment of the present invention. When the user taps on the time card group 212 in the home screen 208, the wearable computing device 102 navigates the user to the time card 282 as shown in FIG. 14A. The user can view the pending time cards by scrolling vertically on the touch sensitive display screen 118. The user can approve or reject the time card 282 and when the user rejects the time card 282, a rejection handoff screen is displayed as shown in FIG. 14B. Then, the user has to utilize the first communication device 104 to complete the rejection process as shown in FIG. 14C.

In one embodiment, a non-transitory computer-readable medium comprises computer-executable instructions stored therein for causing a computer to implement a program executable on the system 100 to manage the action items. The non-transitory computer readable storage medium may comprise a USB memory stick, CD-ROM, DVD or a flash memory. In one embodiment, a non-transitory computer-readable medium comprises computer-executable instructions stored therein for causing mobility solutions to implement a program executable on the system 100 that enables to perform different locations based advertising process utilizing the action management application 120.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions.

It should also be understood that logic codes, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, may be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that may direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowcharts and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

The operations presented herein are not inherently related to any particular computer or other systems. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present invention as described herein. The present invention is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A system for managing at least one action item over a network, the system comprising:
    a wearable computing device in direct contact with a user's wrist, the device operatively coupled to a first communication device, the wearable computing device comprising:
        a display unit having a touch sensitive display screen to display textual and graphical representation of the plurality of action groups, each action group including a plurality of action items;
        a processor installed with an action management application and coupled with a memory unit integrated with a central database, the action management application being in communication with the first communication device, wherein the action management application enables the user to access, manage and update at least one action item of the plurality of action items associated to at least one action group of the plurality of action groups;
        a user interface controller in communication with the display unit, and the processor, the user interface controller being configured to allow the user to tap on the number of pending action items to navigate to a home screen where the user will be provided with the plurality of action groups with the count of each action group, if no pending action items are displayed, then the overview screen displays "zero" in the overview screen, the interface controller further configured to allow the user to select an action group and approve or reject the at least one action item associated to the at least one action group received in the first communication device, wherein when the user rejects the at least one action item associated to the at least one action group, a rejection handoff screen is displayed and the user has to then utilize the first communication device to complete the rejection process; and wherein when the wearable computing device is not connected to the first communication device, the first communication device displays a message indicating the user to log in to his/her user account to stay connected with the wearable computing device;

at least one second communication device in communication with the first communication device, the at least one second communication device being configured to allow the user to send the at least one action item associated to the at least one action group to the first communication device; and wherein the plurality of action groups includes a notification group, a timecard group, an expense group, a project billing group, a request group and a change group.

2. The system of claim 1 wherein the user interface controller is further configured to press the touch sensitive display screen with a small amount of force thereby activating a context menu to approve and reject the plurality of action items associated to the at least one action group at simultaneously.

3. The system of claim 1 wherein the user can vertically scroll on the touch sensitive display screen to view all pending action items corresponding to each action group.

4. The system of claim 1 wherein when the user approves the at least one action item associated to the at least one action group the touch display screen shows an approval confirmation message.

5. The system of claim 1 wherein the user uses the first communication device to complete the rejection process after rejecting the at least one action item associated to the at least one action group by the wearable computing device.

6. The system of claim 1 wherein the wearable computing device is connected to the first communication device when the user logs in to the action management application using the first communication device.

7. A system embodied on a non-transitory computer readable storage medium storing computer program instructions for managing at least one action item over a network, comprising:

a wearable computing device in direct contact with a user's wrist, the device operatively coupled to a first communication device, the wearable computing device comprising:

a display unit having a touch sensitive display screen to display a textual and graphical representation of a plurality of action groups, the plurality of action groups, each action group having a plurality of action items;

a processor installed with an action management application and coupled with a memory unit integrated with a central database, the action management application being in communication with the first communication device, the action management application enables the user to access, manage and update at least one action item of the plurality of action items associated to at least one action group of the plurality of action groups;

a user interface controller in communication with the display unit, and the processor, the user interface controller being configured to allow the user to tap on the number of pending action items to navigate to a home screen where the user will be provided with the plurality of action groups with the count of each action group, if no pending action items are displayed, then the overview screen displays "zero" in the overview screen, the interface controller further configured to allow the user to select an action group and approve or reject the at least one action item associated to the at least one action group received in the first communication device, wherein when the user rejects the at least one action item associated to the at least one action group, a rejection handoff screen is displayed and the user has to then utilize the first communication device to complete the rejection process; and wherein when the wearable computing device is not connected to the first communication device, the first communication device displays a message indicating the user to log in to his/her user account to stay connected with the wearable computing device;

at least one second communication device in communication with the first communication device, the at least one second communication device being configured to allow the user to send the at least one action item associated to the at least one action group to the first communication device; and wherein the plurality of action groups includes a notification group, a timecard group, an expense group, a project billing group, a request group and a change group.

8. The system of claim 7 wherein the user can vertically scroll on the touch sensitive display screen to view all pending action items corresponding to each action group.

9. The system of claim 7 wherein when the user approves the at least one action item associated to the at least one action group the touch display screen shows an approval confirmation message.

10. The system of claim 7 wherein the user uses the first communication device to complete the rejection process after rejecting the at least one action item associated to the at least one action group by the wearable computing device.

11. The system of claim 7 wherein the wearable computing device is connected to the first communication device when the user logs in to the action management application using the first communication device.

* * * * *